United States Patent
Cook et al.

(10) Patent No.: US 10,318,590 B2
(45) Date of Patent: Jun. 11, 2019

(54) USER INTERFACE OPERATION BASED ON TOKEN FREQUENCY OF USE IN TEXT

(71) Applicant: Freedom Solutions Group, LLC, Downers Grove, IL (US)

(72) Inventors: David Cook, Barrington, IL (US); Jacek Zwierzchlejski, Naperville, IL (US); Stacey Kacek, Streamwood, IL (US); Jason Maeder, New Lenox, IL (US); Stewart Beck, Bolingbrook, IL (US)

(73) Assignee: FEEEDOM SOLUTIONS GROUP, LLC, Downers Grove, IL (US)

( * ) Notice: Subject to any disclaimer, the term of this patent is extended or adjusted under 35 U.S.C. 154(b) by 897 days.

(21) Appl. No.: 14/460,744

(22) Filed: Aug. 15, 2014

(65) Prior Publication Data
US 2016/0048512 A1    Feb. 18, 2016

(51) Int. Cl.
*G06F 16/93* (2019.01)
*G06F 16/33* (2019.01)
*G06F 16/338* (2019.01)

(52) U.S. Cl.
CPC ............ *G06F 16/93* (2019.01); *G06F 16/334* (2019.01); *G06F 16/338* (2019.01)

(58) Field of Classification Search
None
See application file for complete search history.

(56) References Cited

U.S. PATENT DOCUMENTS

| | | | |
|---|---|---|---|
| 6,728,752 B1 * | 4/2004 | Chen | G06F 17/3025 707/999.01 |
| 7,779,354 B2 | 8/2010 | Ashcraft et al. | |
| 8,180,783 B1 * | 5/2012 | Fletcher | G06F 17/30684 707/723 |
| 9,002,866 B1 | 4/2015 | Brunsman et al. | |
| 2002/0129066 A1 | 9/2002 | Milward et al. | |
| 2008/0195940 A1 | 8/2008 | Gail et al. | |
| 2009/0327809 A1 * | 12/2009 | Joy | G06F 11/3636 714/26 |
| 2010/0049761 A1 * | 2/2010 | Mehta | G06F 17/30643 707/709 |
| 2012/0303661 A1 * | 11/2012 | Blohm | G06F 17/278 707/776 |

(Continued)

OTHER PUBLICATIONS

Spelling & Grammar Check MS Word2010 Tutorial, Free Online Microsoft Word Tutorials, MS Word 2010—Formatting, published by TestsTestsTests.com.

*Primary Examiner* — Christopher J Raab
(74) *Attorney, Agent, or Firm* — Finnegan, Henderson, Farabow, Garrett & Dunner LLP

(57) ABSTRACT

Operation of a user interface includes performing token based analysis of a baseline text corpus and a targeted text listing. For a selected token in the targeted text listing, a matching baseline token in identified. From a plurality of contexts corresponding to the matching baseline token, context-matched and non-context matched usage data for the matching baseline token is identified and provided to a user interface. Similar processing may be performed on the basis of a related, but matching, baseline token. In another embodiment, instances of similar spelling errors are identified on the basis of a plurality of tokens identified in the targeted text listing.

24 Claims, 9 Drawing Sheets

(56) References Cited

U.S. PATENT DOCUMENTS

2013/0262467 A1* 10/2013 Zhang ............... G06F 17/30705
  707/737
2013/0325442 A1   12/2013 Dahlmeier et al.
2016/0004667 A1*  1/2016 Chakerian ............. G06F 17/212
  715/277

* cited by examiner

FIG. 9

USER INTERFACE OPERATION BASED ON TOKEN FREQUENCY OF USE IN TEXT

CROSS-REFERENCE TO RELATED APPLICATION

The instant application is related to application Ser. No. 14/460,773, filed Aug. 15, 2014 (now U.S. Pat. No. 10,061,765), entitled "USER INTERFACE OPERATION BASED ON SIMILAR SPELLING OF TOKENS IN TEXT".

FIELD

The instant disclosure relates generally to man-machine user interfaces and, in particular, to the provision and operation of such user interfaces based on token usage data in text listings.

BACKGROUND

The use of machines in the production of text-based documents is well known in the art. For example, various types of processor-enabled devices, e.g., computers, have long been capable of producing documents in electronic form using so-called word processing programs such as "MICROSOFT" Word. Such machines typically incorporate user interfaces that permit a user of the machine to effectively interact with the machine by offering various features enabling efficient and consistent creation/manipulation of text document Bs. Generally, these user interface features are directed to the structure, organization and presentation of the text included in a given document. For example, users are typically able to select functions that facilitate the organization of blocks of text in any desired order, the formatting of various portions of text, the addition of multiple types of headings, the adherence to grammatical rules, etc. While useful, such structure/organization/presentation features for use in manipulating text are limited in that they fail to provide any semantic insight to the text being manipulated.

In this same vein, the lack of semantic understanding of such user interface features tends to limit their capabilities. For example, in the case of identifying typographical errors, current devices are unable to appreciate that words within a document, when spelled correctly according to one or more dictionaries, may nevertheless contain typographical errors to the extent that such words were accidentally included when another word was intended.

Thus, further developments that would facilitate the ease of use of such interfaces based not just on organizational/presentational aspects, but also on potential semantic significance of the document content, would be well received.

SUMMARY

The instant disclosure describes techniques that improve use of a machine user interface related to the production/manipulation of text-based documents by presenting information that incorporates semantic understanding of the text being processed. Having such additional information at their disposal, users of such machines are able to more quickly, efficiently and reliably interact with text-based documents.

In an embodiment, at least one token is identified in a targeted text listing by one or more processors. For each of these tokens, a corresponding context is also identified by the processor(s). For a selected token taken from the tokens thus identified, a matching baseline token is determined. The matching baseline token, which is taken from a baseline text corpus, has a plurality of baseline contexts associated therewith. In an embodiment, the baseline text corpus comprises text belonging to a selected domain to which the targeted text listing also belongs. Based on the match between the selected token and the matching baseline token, context-matched usage data and non-context-matched usage data is identified by the processor(s). The context-matched usage data comprises frequency of use data for the matching baseline token in a first baseline context that matches the corresponding context of the selected token, whereas the non-context-matched usage data comprises frequency of use data for the matching baseline token in a second baseline context that does not match the corresponding context of the selected token. Thereafter, the context-matched usage data and the non-context-matched usage data is provided to a user interface by the processor(s). When provided to the user interface, such usage data may be provided in graphical, symbolic or textual form or any combination thereof.

In another embodiment, the processor(s) identify one or more baseline tokens in the baseline text corpus and, for each baseline token, the processor(s) further identify a plurality of corresponding baseline contexts. Thereafter, for each baseline token and for each baseline token's various baseline contexts, the processor(s) determine frequency of use data, i.e., the number of occurrences of the baseline token within the baseline context in the text corpus. The processor(s) then store the frequency of use data in association with the corresponding baseline token and baseline context. In an embodiment, a normalizing parameter, determined according to each baseline context, is used to normalize the frequency of use data corresponding to each baseline token/baseline context pair, thereby enabling meaningful comparisons between such frequency of use data.

In another embodiment, the same processing may be used by the processor(s) to identify additional context-matched usage data and additional non-context-matched usage data for a related baseline token based on the selected token. The related baseline token may have any of variety of relationships, e.g., semantic, categorical, etc. to the selected token. As before, the additional context-matched usage data and additional non-context-matched usage data may also be provided by the processor(s) to the user interface, thereby permitting comparisons between the usage data of the matching baseline token and the related baseline token.

In yet another embodiment, a plurality of tokens are identified by the processor(s) in the targeted text listing. Thereafter, the processor(s) identifies a first token from the plurality of tokens as an instance of a similar spelling error based on similarity of the first token to a second token from the plurality of tokens. That is, the similar spelling error instance is identified solely on the basis of other tokens found in the targeted text listing, and not on any external dictionaries or the like. Once identified, the similar spelling error instance, including the first and second tokens, is provided by the processor(s) to a user interface. In response to the similar spelling error instance, the processor(s) may receive, via the user interface, user input that resolves the similar spelling error instance.

In identifying the similar spelling error instance, the processor(s) may identify an occurrence of a predefined phrase in the plurality of tokens. The processor(s) may then exclude each token of the plurality of tokens within the occurrence of the predefined phrase from being identified as either an instance of typographical error or an instance of a similar spelling error. In an alternative, the processor(s) may determine a number of occurrences within the targeted text listing for each token of the plurality of tokens. Thereafter, when the number of occurrences for a token is not less than a threshold, the processor(s) may exclude that token from being identified as either an instance of typographical error or an instance of a similar spelling error. In yet another alternative, the processor(s) may determine whether a token of the plurality of tokens satisfies an exclusion rule and, if so, the processor(s) may exclude that token from being identified as either an instance of a typographical error or an instance of a similar spelling error.

For a token of the plurality of tokens that has not been excluded from being identified as an instance of a typographical error or an instance of a similar spelling error, the processor(s) can identify at least one similar token from the plurality of tokens. In an embodiment, similarity of tokens may be assessed according to the number of changes required to transform the token into the similar token. Thereafter, the processor(s) may determine whether a similar token thus identified satisfies a similar token exclusion rule and, if so, the processor(s) may exclude the token from being identified as either an instance of a typographical error or an instance of a similar spelling error. Where any similar token is not excluded in this fashion, the processor(s) provide the token as the similar spelling error instance and further provide the similar token as the second token, noted above.

In a further embodiment, a third token of the plurality of tokens that has not been identified as an instance of a similar spelling error and that has not been excluded from being identified as a typographical error may be identified by the processor(s) as being a typographical error based on a dictionary, which typographical error, including the third token, may then be provided by the processor(s) to the user interface.

Further embodiments directed to an apparatus and computer-readable medium in accordance with the instant disclosure are also described herein.

BRIEF DESCRIPTION OF THE DRAWINGS

The features described in this disclosure are set forth with particularity in the appended claims. These features and attendant advantages will become apparent from consideration of the following detailed description, taken in conjunction with the accompanying drawings. One or more embodiments are now described, by way of example only, with reference to the accompanying drawings wherein like reference numerals represent like elements and in which:

FIG. 9 is an example of a user interface particularly directed to presentation of similar spelling error instances in accordance with the second embodiment of the instant disclosure.

DETAILED DESCRIPTION OF THE PRESENT EMBODIMENTS

Figure 1:
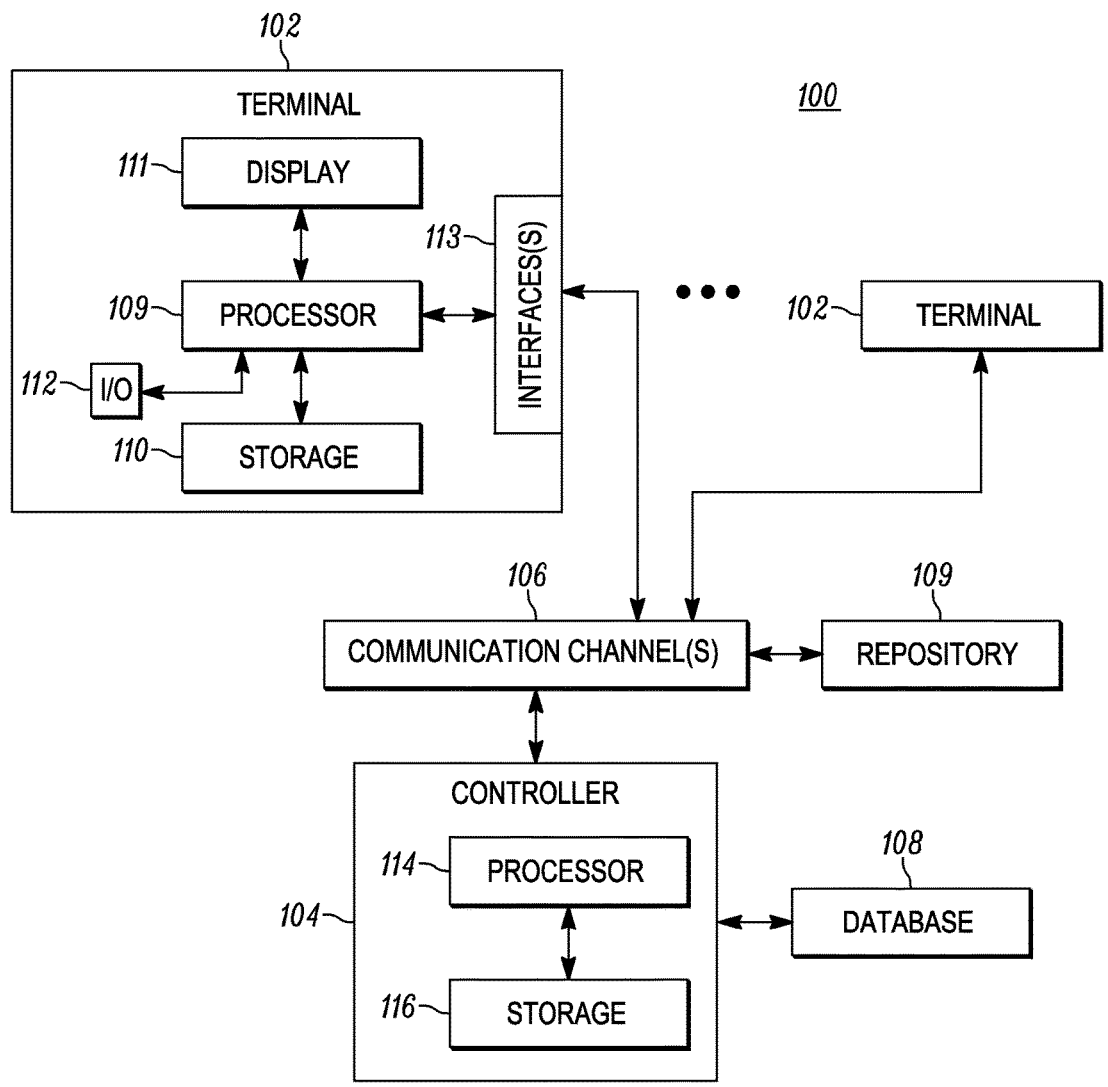
FIG. 1 is a schematic block diagram of a system in accordance with an embodiment of the instant disclosure.

FIG. 1 illustrates a schematic block diagram of a system 100 that may be used to implement the various embodiments described herein. Generally, the system 100 comprises one or more user terminals 102 that may be in optional communication with each other and a controller 104 via one or more communication channels 106. In a presently preferred embodiment, each of the user terminals 102 comprises a processor-based device having one or more processors 109 in communication with at least one storage component 110. For example, the terminals 102 may comprise desktop, laptop or hand held computers, mobile devices, etc. The processor(s) 109 may comprise microprocessors, microcontrollers, digital signal processors, etc. or combinations thereof operating under the control of executable instructions stored in the storage component(s) 110. The storage component(s) 110 (or machine-readable media) may comprise any combination of volatile/non-volatile memory components such as read-only memory (ROM), random access memory (RAM), electrically erasable programmable read-only memory (EEPROM), etc. Further still, the storage component 204 may be embodied in a variety of forms, such as a hard drive, optical disc drive, floppy disc drive, etc. The executable instructions stored in the storage component(s) 110 may be particularly used to implement processing as described in greater detail below. However, as known in the art, the user terminals 102 may be implemented, in whole or in part, using other components such as application specific integrated circuits (ASICs), programmable logic arrays, etc. that may operate under software or hardware control.

As further illustrated, each user terminal 102 preferably comprises a display 111 in communication with the processor(s) 109. As known in the art, the display 111 may comprise an integral or external display such as a cathode-ray tube (CRT), liquid crystal display (LCD), light emitting diode (LED) display, etc. In a similar vein, the user terminals 102 preferably include user input/output components 112 as well as one or more communication interfaces 113. The I/O components 112 may comprise any mechanism that allows a user of the user terminal 102 to interact therewith, e.g., a mouse, keyboard, microphone, video and/or still image camera, speaker, etc. Techniques for providing a user interface via a display 111 and I/O components 112 are well known in the art. The communication interface(s) 113 support the use of the one or more communication channels 106 and typically comprise any combination of hardware and/or software elements necessary to terminate physical links (e.g., Ethernet, wireless, etc.) or communication protocols (e.g., HTTP, SOAP, SSL, TCP/IP, etc.). Techniques for implementing the interface(s) 113 are well known to those having skill in the art.

The communication channels 106 may comprise any one or combination of wired or wireless communication channels, depending on the capabilities of the terminals 102 and/or controller 104. Additionally, the communication channels 106 may comprise publicly available or privately controlled communication resources. For example, in an embodiment, the communication channels 106 may be embodied by the Internet/World Wide Web, though the instant disclosure is not limited in this regard.

As shown, the controller 104 preferably comprises a processor-based device comprising at least one processor 114 and at least one storage component 116 (machine-readable media) as described above with regard to the user terminals 102. In a presently preferred embodiment, the controller 104 is implemented using one or more server computers as known in the art. Additionally, the controller 104 may be in communication with a database 108 that, as known in the art, can also be implemented using one or more server computers. The database 108 or storage component 110 may be used to store text-based documents that are operated upon in accordance with the teachings described herein. Further still, such documents or the like may be stored in a repository 120, as known in the art, in communication with the terminals 102 and/or controller 104. For example, a given entity or organization (e.g., enterprise or business, educational institution, government office, etc.) may implement and store documents in such a repository 120.

Figure 2:
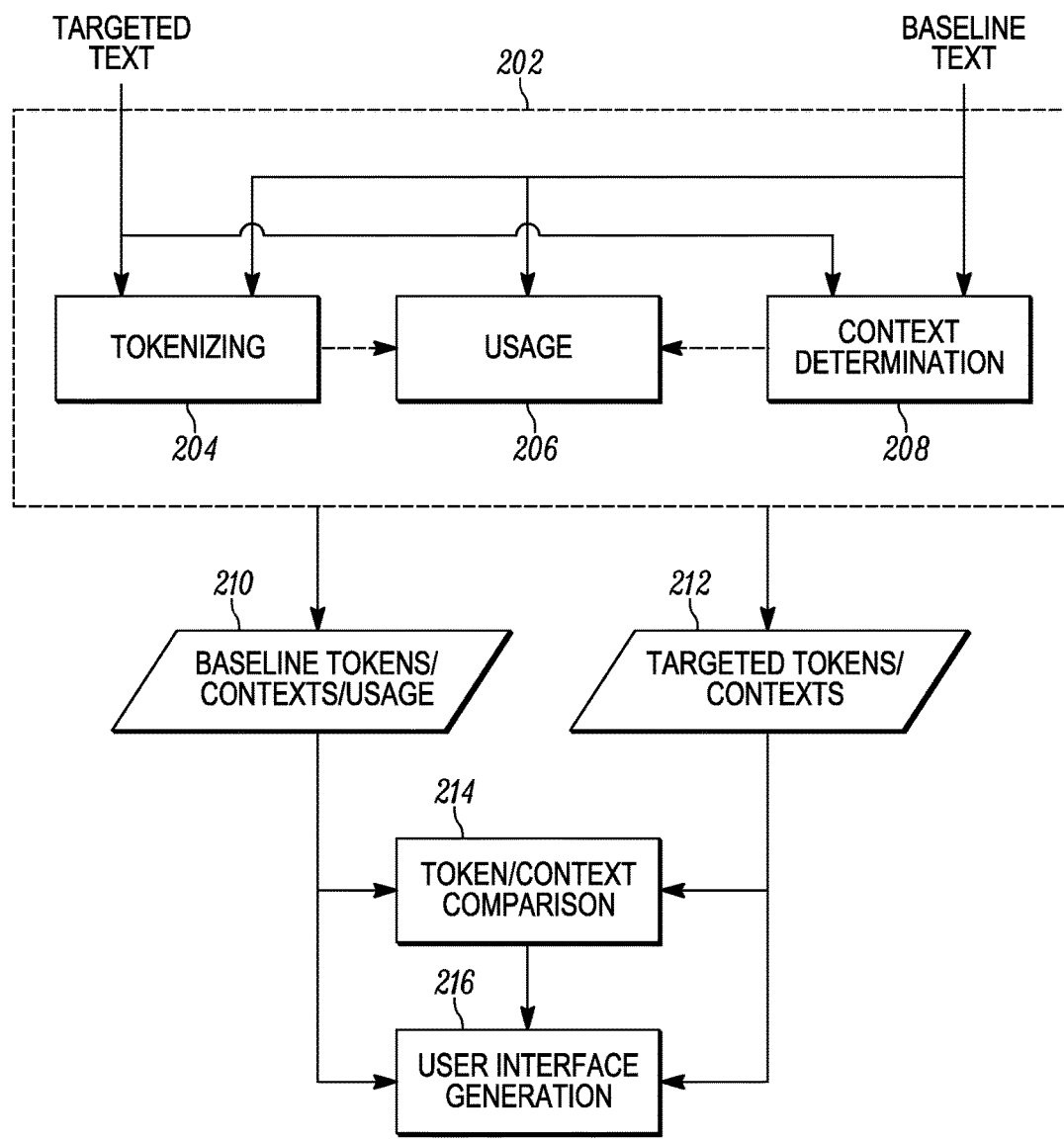
FIG. 2 is a functional block diagram of a technique for implementing a user interface in accordance with a first embodiment of the instant disclosure.

Referring now to FIG. 2, a functional block diagram of a first embodiment is illustrated. In particular, the illustrated functionality may be used to implement a user interface based on context-matched and non-context-matched usage data of tokens within a baseline corpus of text, as described in further detail below. As will be appreciated by those having ordinary skill in the art, the processing embodied by the functional block diagram of FIG. 2 (as well as the flowcharts illustrated in FIGS. 3 and 4) may be implemented by the system 100 described above, particularly one of or a combination of the various processors 109, 114 operating under the control of instructions stored on the corresponding storage components 110, 116.

As shown, token processing 202 comprises a tokenizing component 204, usage component 206 and a context determination component 208. In the first embodiment, targeted text, from a targeted text listing, is provided to the tokenizing and context determination components 204, 208, whereas the baseline text, from a baseline text corpus, is provided to the tokenizing, usage and context determination components 204-208. The targeted text listing may comprise text data to be analyzed in electronic format and may be embodied in any of a variety of forms. For example, the targeted text listing may comprise a digitally stored, text-based document (such as a document file produced using the "MICROSOFT" Word processing software) or a portion thereof. Alternatively, the targeted text listing may comprise a plurality of documents that may be found, for example, in a document repository or the like. In a similar vein, the baseline text corpus may comprise a plurality of text-based documents found in a suitable collection or repository, and preferably consist of a comparatively large number of such documents in order to develop meaningful frequency of use data, as described in further detail below. In another presently preferred embodiment, both the targeted text listing and the baseline text corpus are all consistent with a specific domain. As used herein, a domain comprises documents or portions thereof having consistent formatting and purpose in a given field of endeavor. For example, patent applications, regulatory filings, contracts, legal briefs, etc. are examples of documents that are typically formatted consistently between documents and are drafted with similar, specific purposes in mind. As described below, by operating on documents within specific domains, meaningful comparisons of usage data may be obtained and provided via a user interface, thereby providing previously unavailable semantic insight to a user.

The tokenizing component 204 performs token analysis of the targeted text or baseline text using techniques well known in the field of language processing. Specifically, the tokenizing component 204 groups the text into meaningful elements called tokens typically consisting of individual words, but also possibly including phrases (e.g., "et al"), numbers (e.g., "60601"), symbols (e.g., "$") or other groupings of characters (e.g., "U.S.").

The context determination component 208 provides various metadata values for a given token, which metadata values collectively establish a "context" for that token. For example, such metadata values may include the domain of the document in which the token is found, a classification of the document, a section within the document, a last edit date of the document, etc. The specific metadata values that may be used to establish contexts for tokens may vary according to domains. For example, a patent application (which is an example of a specific domain) may be categorized according to specific Cooperative Patent Classification (CPC) class, e.g., "A01B 1/00" or portion thereof and a given token may occur in a "claims" section or in a "specification" section of the patent application. Conversely, a real estate contract is within another domain and may be categorized according to "residential" or "commercial," and a given token may occur in a "mortgage contingency" section or a "closing" section.

For targeted text, the context determination component 208 may determine a context for each instance of a token within the targeted text listing. Thus, for example, in a patent application, a token corresponding to the word "comprising" may be found multiple times in both the "specification" section and in the "claims" section. In this case, the contexts for each instance of this token may be nearly identical except for their respective section metadata values. Similarly, in the case of baseline text, the context determination component 208 will determine a context for each instance of a token within the baseline text corpus. Assuming that the baseline text corpus is considerably larger than the targeted text listing (e.g., hundreds or thousands of documents versus a single document), there may be a likelihood that a given token will occur in many different contexts within the baseline text corpus. As described in further detail below, these contextual distinctions in baseline usage of a given token permit the development of context-matched and non-context-matched usage data. When incorporated into a user interface, such usage data may provide a user with greater insight into the content of the targeted text listing, thereby permitting the user to manipulate the text with greater efficiency and certainty.

The usage component 206 determines frequency of use data for a given token within the baseline text. More specifically, as shown by the dotted lines between the usage component 206 and the tokenizing and context determination components 204, 208, the usage component 208 counts the number of occurrences of a given token within the various contexts for that token. Thus, for example, the usage component 208 may determine that a token corresponding to the word "comprising" occurs 250,000 times in "claims" sections of a given baseline text corpus and occurs 1,500,000 times in "specification" sections of the baseline text corpus. As will be appreciated, such frequency of use data for a given token may be effected not only by the relative frequency of use of a given token, but also by characteristics of a given context. To control for the effects of a given context on corresponding frequency of use data, context-dependent normalizing parameters may be used. For example, in the previous example concerning the word "comprising," the contexts primarily characterized by the "claims" versus the "specification" sections may be normalized by the total number of tokens occurring within those respective contexts. In another embodiment, described below, contexts may be further defined by specific periods of time, e.g., different years. In this case, the normalization parameter may be defined as the average number of total tokens within a given context over all time periods divided by the actual number of tokens within the given context for a specific time period. As a consequence, for a given context, the raw data size for a given period of time is mitigated through comparison with a long term average. This normalization parameter may then be used to normalize (in this case, by multiplying) the frequency of use of a certain token in the given context for the specific period of time. Again, in this manner, differences in the raw size of the frequency counts for the respective contexts may be accounted for, thereby permitting a more meaningful comparison of trends in usage of the "comprising" token between these contexts.

As further shown in FIG. 2, the token processing 202 provides as output 210 the baseline tokens and their corresponding contexts and usage data, which may be collectively stored in a suitable storage device, database, etc. Likewise, the token processing 202 provides as output 212 the targeted tokens and their corresponding contexts, which data may also be collectively stored in a suitable storage device, database, etc. In an embodiment, it is anticipated that the token processing 202 performed on the baseline text may be implemented by a centralized processing device, such as the controller 104 to the extent that it may operate on a baseline text corpus that is widely distributed. Conversely, the token processing 202 performed on a targeted text listing may be implemented by more localized or distributed devices such as the terminals 102. Nevertheless, it may be desirable to implement both baseline and targeted text listing processing by one or the other type of processing device as a matter of design choice.

Operating on the stored baseline token data 210 and targeted text token data 212, a token/context comparison component 214 identifies occurrences of matching targeted text and baseline tokens as well as instances of matching and non-matching contexts between such matched tokens. The determination of matching tokens may be accomplished through straightforward comparison of tokens to see which tokens match identically, or at least to a desired degree, depending on the nature of the tokenization. For example, as known in the art, the tokenization component 204 may also incorporate the well-known process of stemming in which certain words sharing the same stem are reduced to that stem. For example, the words "form", "formed", "forming" and "formation" may all be treated as separate instances of the stem "form", which may then be treated as a single token. In this instance, the words "form", "formed", "forming" and "formation" will match each other to the extent that they are represented by the single token "form". On the other hand, where such stemming is not performed or, at least in this example, results in the separate tokenization of the words "form", "formed", "forming" and "formation", matches will only occur between identical tokens, e.g., the token "formed" will not match occurrences of the tokens "form", "forming" or"formation".

In those instances where the token/context comparison component 214 identifies matching tokens between a selected token from the targeted text tokens and a baseline token, the token/context comparison component 214 is further operative to determine matching and non-matching contexts. Contexts may be considered a separate instances in a multi-dimensional metadata space. For example, where contexts may be described according to five different metadata elements, each having five different possible metadata values, there would be $5^5=3125$ different possible contexts. Thus, it may be possible to identify matching contexts only in those instances in which all metadata values across all possible metadata elements match exactly. Alternatively, it may be desirable to establish a hierarchy of metadata elements such that matching metadata values between certain primary or selected metadata elements is sufficient to designated two different context instances as being matched. For example, in the context of patent applications, two contexts may be sufficiently matched if they both share the same "CPC class" and "section" metadata values, e.g., contexts are matched if the both include the "A01B 1/00" CPC class value and the "claims" section value regardless of any other metadata values defining the respective contexts. In an embodiment, a default set of metadata elements sufficient to give rise to matching contexts may be designated, which default set can then be modified according to user preferences. Continuing with the previous example, the "section" metadata element may be configured as a sufficient matching condition by default, but then be modified later on via user input to include the "CPC class" metadata element as a necessary condition to finding matching contexts.

Additionally, such default/user selectable configurations may be used by the token/context comparison component 214 to likewise determine non-matching contexts. That is, a non-matching context could be deemed to be any context differing from another context by any single metadata value. In a metadata space of even modest size having multi-valued metadata elements, this could result in a large number of non-matching contexts, some of which may have more significance than others. For example, in the patent application domain, differences in token usage between the "claims" section and the "title" section are likely to be considered less meaningful than differences in token usage between the "claims" section and the "specification" section. Thus, in an embodiment, a default set of non-matching metadata elements may be designated, which default set could again be modified according to user input. Continuing with the previous example, by default designation, the only non-matching contexts of interest may arise when the "section" metadata elements for two given contexts differ according to their respective "claims" and "specification" values. Thereafter, user modifications could be provided such that the default set only recognizes non-matching contexts when the "section" metadata elements differ as described, but also when the "CPC class" metadata elements likewise differ according to some desired metadata values. In this fashion, the token/context comparison component 214 can identify both matching and non-matching contexts and frequency of use data corresponding to such matching and non-matching contexts.

Finally, a user interface generation component 216 is provided to generate a user interface based on the context-matched usage data and the non-context-matched usage data. Specifically, the frequency of use data for both the matching contexts and non-matching contexts of the selected token (taken from the targeted text tokens) and the matching baseline token (taken from the baseline tokens) is provided to a user interface, which may display the usage data in any of a variety of forms. For example, a graphical form may be employed in which the usage data is shown as points in a graph or the like. Alternatively, the usage data may be presented in a symbolic form in which various visual features are employed to indicate characteristics of the usage data, e.g., usage data above a threshold is indicated as one color, whereas usage data below the threshold is indicated as another color. Further still, the usage data may be illustrated in textual form. It is further understood that combinations of these different presentation forms may also be utilized as a matter of design choice.

Figure 3:
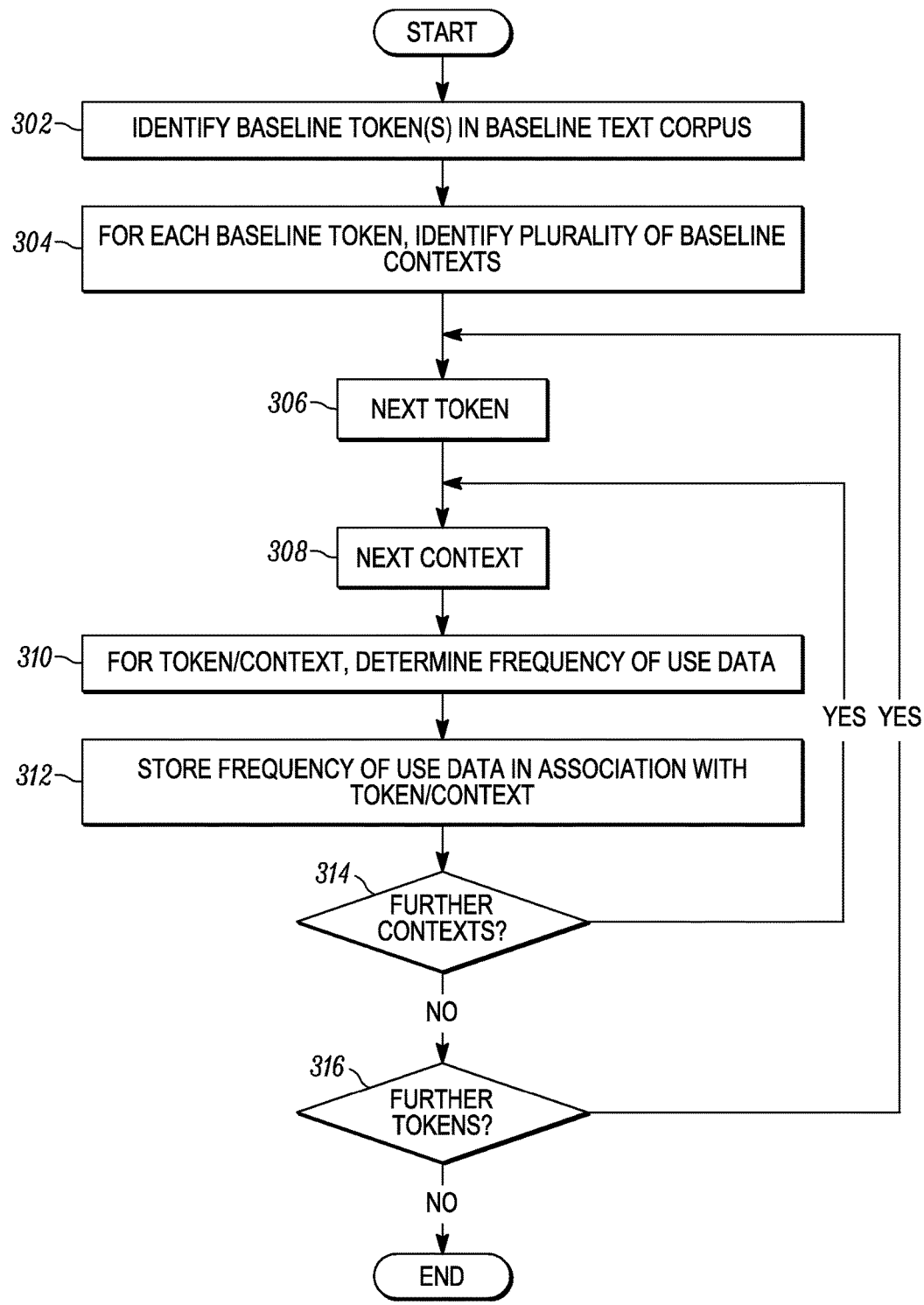
FIG. 3 is a flowchart illustrating baseline processing in accordance with the first embodiment of the instant disclosure.

Referring now to FIG. 3, a flowchart illustrating baseline processing in accordance with the first embodiment is shown. Thus, beginning at block 302, at least one baseline token is identified in a baseline text corpus. In practice, the baseline text corpus may be obtained in any of a variety of ways. For example, where a document repository or similar storage arrangement is provided, all of the documents within the repository or a selected subset thereof may serve as baseline text corpus. As noted previously, the baseline text corpus preferably only includes documents or other text pertaining to a specific document. Thus, for example, the baseline corpus may be found with in a law firm document management system and include only those documents identified as a "purchase agreement." Alternatively, the baseline corpus may be discovered within a distributed network of documents, as in the case where a so-called web crawler is employed to search World Wide Web content meeting specific criteria. Further still, structured databases available via one or more networks may serve as a source for the baseline text corpus. For example, the U.S. Patent & Trademark Office offers online databases comprising millions of patent documents. Those having ordinary skill in the art will appreciate that still other sources, or combinations thereof, may serve as sources of a suitable baseline text corpus.

Continuing at block 304, for each baseline token identified at block 302, a plurality of baseline contexts are identified. In a highly simplified example, a given baseline text corpus may have four different tokens identified therein, each having three different contexts (it being understood that, in practice, the number of contexts per token could, and likely would, vary greatly) for a total of 12 different token/context combinations. Thereafter, blocks 306-316 implement a loop in which each token/context combination is analyzed to determine corresponding frequency of use data.

Thus, at block 306 a baseline token from the one or more baseline tokens (identified as block 302) is chose. Relative to that baseline token, a corresponding baseline context is identified at block 308. Thereafter, at block 310, frequency of use data for the baseline token relative to the corresponding context is determined. For example, for the token "comprising", the total number of occurrences of that token within the baseline text corpus and matching the corresponding baseline context (e.g., "section"="claims" and "claim type"="independent") is tallied. As noted above, the frequency of use data may be normalized according to a normalizing parameter determined according to the corresponding baseline context.

Thereafter, at block 312, the frequency of use data is stored in association with the baseline token and its corresponding context. For example, a database may be established in which each record in the database comprises an identification of a baseline token, data describing the corresponding context and the frequency of use data. In an embodiment, each baseline context may incorporate a time or date component through which a temporal aspect of a given token's usage may be identified. For example, the baseline tokens for a baseline text corpus in the patent application domain may include a metadata element concerning "filing date" or "filing year" of the underlying patent application. In a presently preferred embodiment, the frequency of use data may be further broken out according to this temporal metadata element. For example, the frequency of use data for a given token relative to patent applications filed in 2012 may be stored separately from the frequency of use data for that token relative to patent applications filed in 2013. As illustrated in further detail below, tracking of temporal aspects of the frequency of use data facilitates the discovery of trends in the usage data.

Regardless, processing continues at block 314 where it is determined whether further contexts for the baseline token remain to be processed. If so, processing continues at block 308 as described above. This is repeated until the query at block 314 determines that no further contexts for the baseline token remain. Processing then continues at block 316 where it determined whether further baseline tokens (and their corresponding contexts) remain to be processed. If so, processing continues at block 306 as described above. If not, processing of the baseline text corpus is completed when the query of block 316 is answered in the negative.

Figure 4:
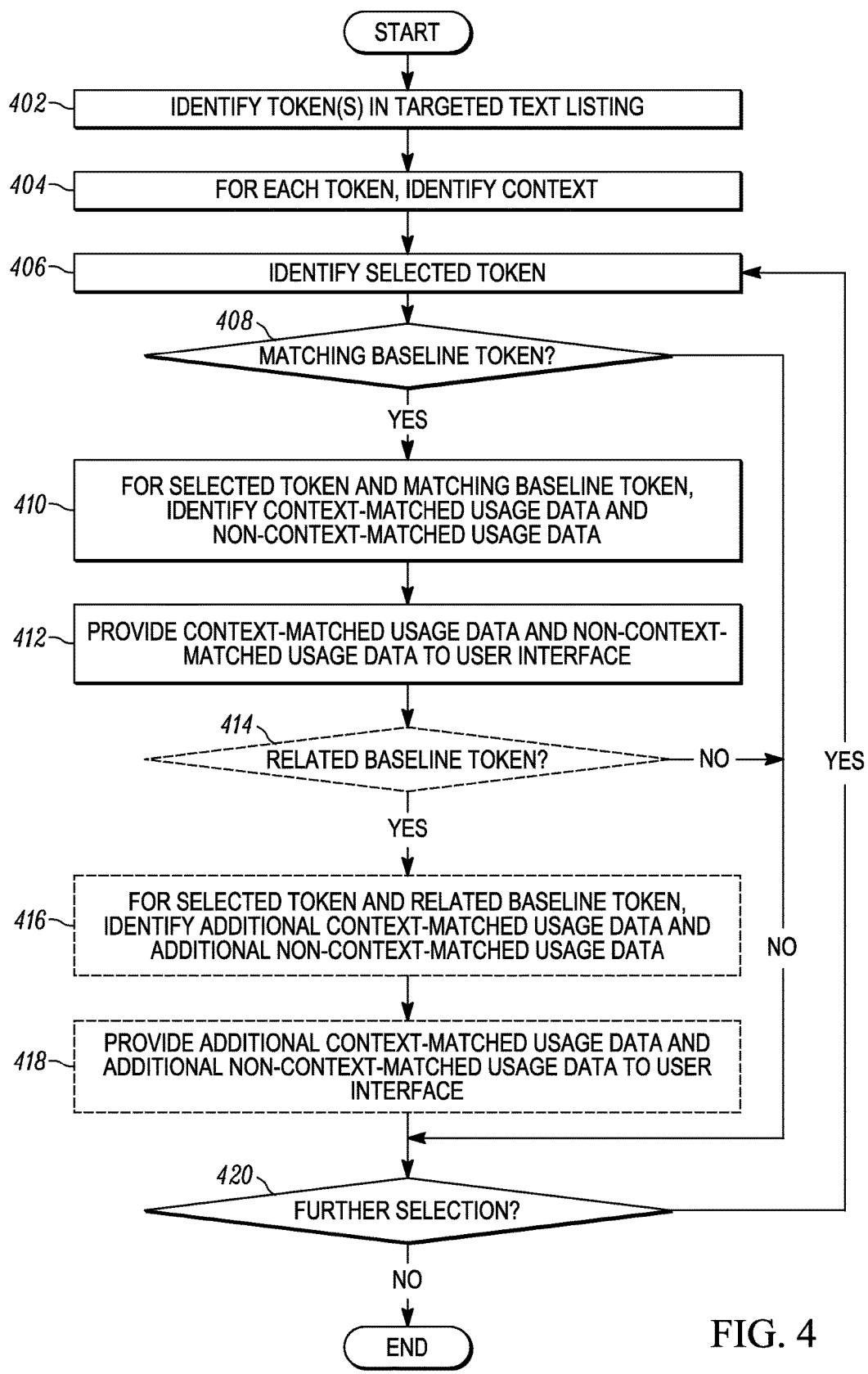
FIG. 4 is a flowchart illustrating targeted text listing processing in accordance with the first embodiment of the instant disclosure.

Referring now to FIG. 4, a flowchart illustrating targeted text processing in accordance with the first embodiment is shown. Thus, beginning at block 402, at least one token is identified in a targeted text listing. In practice, the targeted text listing may be obtained in any of a variety of ways substantially similar to those described above for the baseline text corpus relative to block 302. For example, an identification of an electronic document may be received by a processor, which identification is sufficient for the processor to locate and retrieve the electronic document from a storage device, database, repository, etc. In another embodiment, the targeted text listing may be received by a processor via a user interface implemented by the processor. For example, the user interface may include a text box (or similar user interface widget, as known in the art) through which a user can paste text data.

Regardless, processing continues at block 404 where a corresponding context is identified for each token from block 402. Thereafter, a selected token may be identified at block 406. In an embodiment, the selected token may be identified through a default process where, for example, the first token identified at block 402 is identified as the selected token. Alternatively, user input may be provided to identify the selected token. For example, the targeted text listing may be displayed to the user whereby the user is able to select an individual word, phrase, symbol, etc. having a token corresponding thereto. In this fashion, the token corresponding to the selected word is treated as the selected token. Once again, those having ordinary skill in the art will appreciate that still other techniques may be employed to identify a selected token from the targeted text tokens.

Having identified a selected token, processing continues at block 408 where there is a matching baseline token that matches the selected token. Once again, the baseline tokens against which the selected token is compared are preferably derived from a baseline text corpus having the same domain as the targeted text listing. If a matching baseline token for the selected token is not identified at block 408, processing may continue at block 420 where it is determined whether another selected token has been identified. This process of identifying selected tokens and seeking out matching baseline tokens continues until such a match is found.

Upon identifying a matching baseline token, processing continues at block 410 where context-matched usage data and non-context matched usage data is determined for the selected token and the matching baseline token. Once again, the various techniques described above can be used for this purpose. Thereafter, at block 412, the context-matched usage data and the non-context-matched usage data is provided to a user interface where it is presented to a user. An example of such a user interface is illustrated in FIG. 5.

Figure 5:
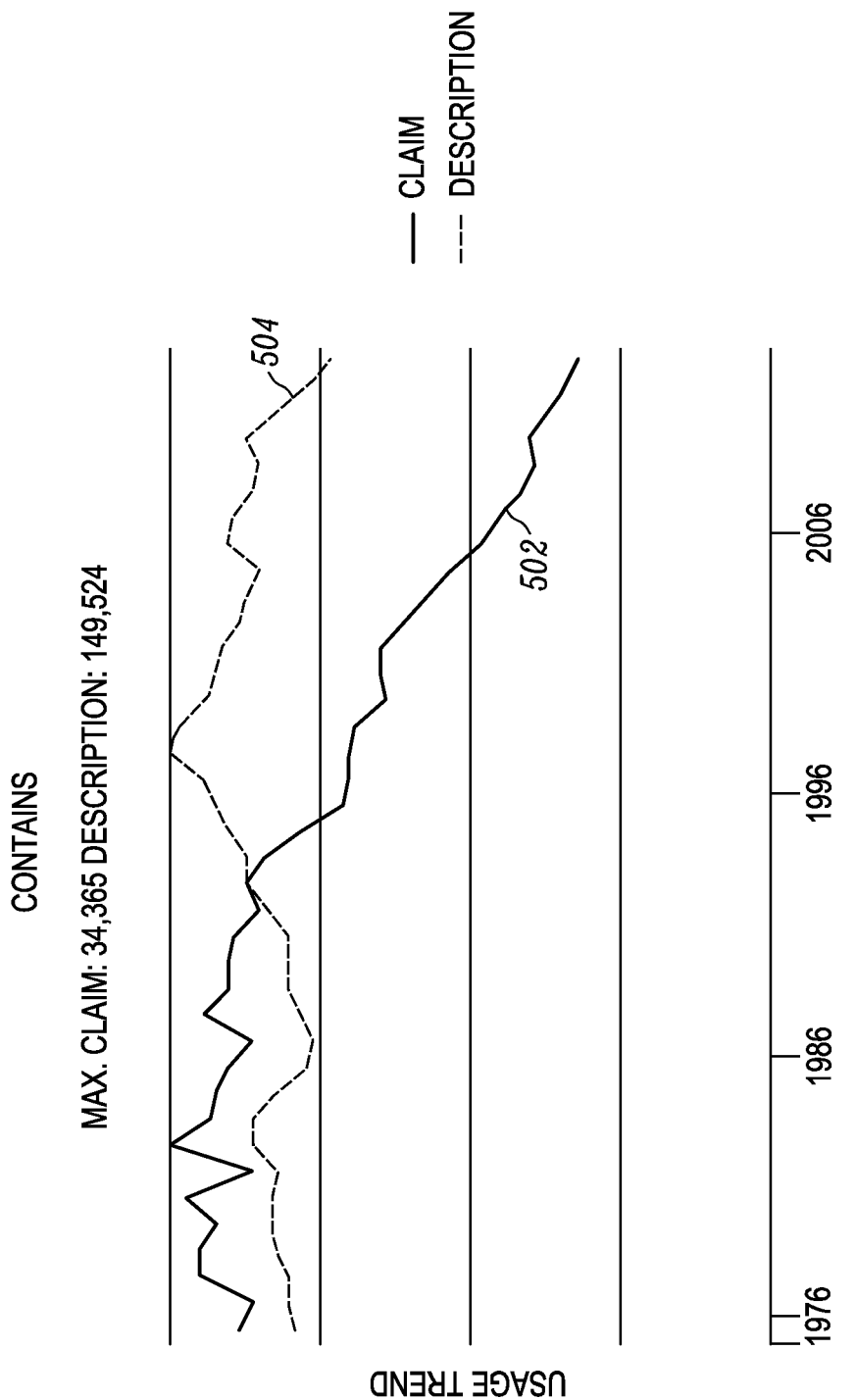
FIG. 5 is an example of a user interface particularly directed to presentation of context-matching usage data and non-context-matching usage data in accordance with the first embodiment of the instant disclosure.

The example of FIG. 5 illustrates context-matched 502 and non-context matched 504 usage data in the case of patent application domain documents. In the illustrated example, it is assumed that a token corresponding to the word "contains" has been selected, which token occurs within the context of "section"="claims". In this case, then, the context-matched usage data 502 corresponds to frequency of use data (normalized) determined for the matching baseline token "contains" having the same "section"="claims", i.e., matching, context. Similarly, the non-context-matching usage data 504 is drawing from another baselines context for the matching baseline token "contains" having a "section"="description", i.e., non-matching, context. The illustrated example further shows a temporal aspect of the usage data in which a "year" metadata element is used to distinguish between subsets of the usage data 502, 504. Normalization of the usage data is illustrated by the fact that the vertical scale does not include any values, but does indicate the maximum frequency of use values across all of the displayed years. That is, the illustrated frequency of use data 502, 504 are normalized according to the maximum values for both the matching and non-matching contexts, i.e., 34,365 for the "section"="claims" context occurring around 1982 and 149,524 for the "section"="description" context occurring around 1998. Given this temporal context, the usage data indicates that use of the word "contains" fell out of favor for use in the claims starting around the mid 1990's, though use of that term within patent descriptions has remained relatively flat. This information might suggest to a user that their use of the word "contains" in the claims (i.e., the matching context) may not be in keeping with prevailing wisdom, thereby causing the user to consider whether such usage is actually desired. In this manner, the user is provided with semantic information not previously available, thereby permitting the user to consider whether further amendments to the text are desired.

Referring once again to FIG. 4, following provision of the usage data to the user interface, processing may optionally continue at blocks 414-418 where a related baseline token based on the selected token may be identified and further processed. As used herein, a related baseline token is any baseline token having a certain type of relationship (though, non-matching) relative to the selected token. For example, the related baseline token may have any of a number of semantic relationships to the selected token. That is, the related baseline token may have any of the following relationships to the selected token: a synonym relationship (i.e., same meaning), an antonym relationship (i.e., opposite meaning), a hypernym relationship (i.e., the related baseline token has a more general "type of" relationship relative to the selected token as in a "bird" is a hypernym of a "sparrow"), a meronym relationship (i.e., the related baseline token has a "member or constituent part of" relationship relative to the selected token as in an "engine" is a meronym of a "car") or a holonym relationship (i.e., the related baseline token denotes a whole of which the selected token is a part or member of as in "car" is a holonym of an "engine"). Alternative relationships may also be used for this purpose. For example, a homophone relationship (i.e., similar sounding) may be used. Further still, a relationship may be premised on a shared trait of both the related baseline token and the selected token, as in the case of both tokens sharing the same categorization, or a similar trend behavior or a similar overall usage count. Once again, those having ordinary skill in the art will appreciate that other bases may be used to establish such a relationship.

If a related baseline token is not identified at block 414, processing may continue at block 420 as described above. If a related baseline token is identified at block 414, processing continues at block 416 where additional context-matched usage data and additional non-context matched usage data is determined on the basis of the selected token and the related baseline token. It is noted that the processing of block 416 is essentially identical to the processing of block 410 described above, with the distinction that it performed on the basis of a related baseline token, rather than a matching baseline token. Thereafter, at block 418, the additional context-matched usage data and the additional non-context-matched usage data is provided to a user interface where it is presented to a user. Another example of such a user interface is illustrated in FIG. 6.

Figure 6:
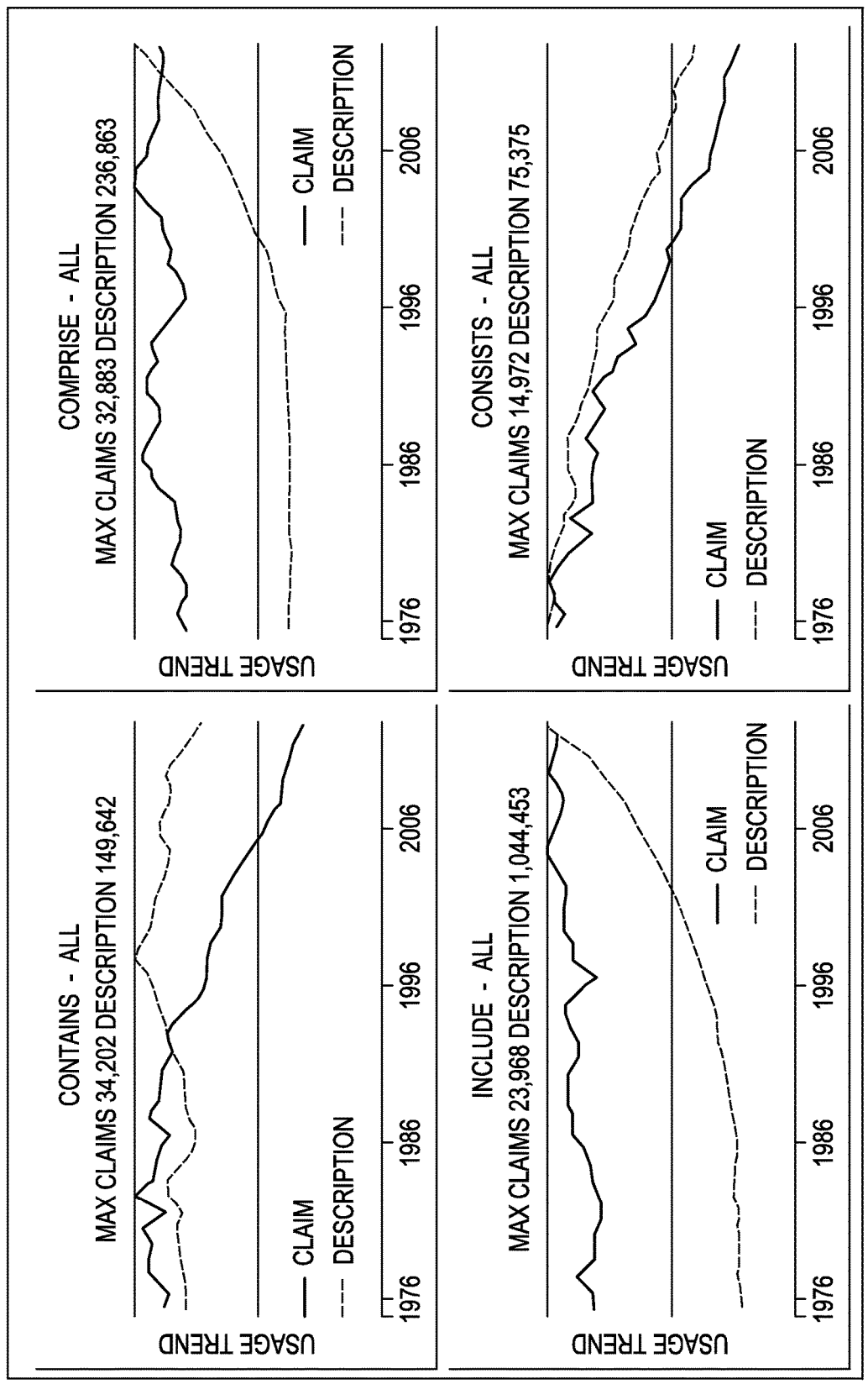
FIG. 6 is another example of a user interface particularly directed to presentation of context-matching usage data and non-context-matching usage data in accordance with the first embodiment of the instant disclosure.

As shown in FIG. 6, additional context-matched and additional non-context-matched usage data is illustrated. In particular, various synonyms for the token "contains", i.e., "comprise", "include" and "consists", are illustrated in substantially the same manner as that shown in FIG. 5. In this manner, a user is able to readily compare trends in usage for a selected token and various related tokens.

Figure 7:
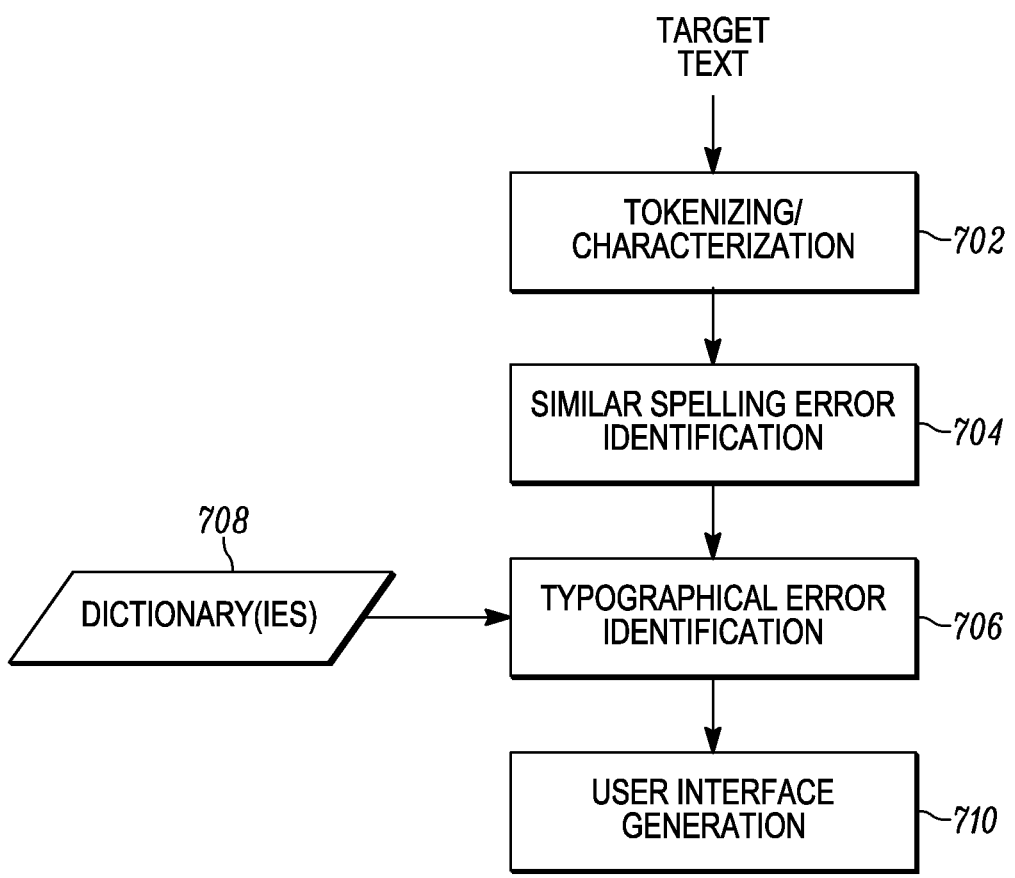
FIG. 7 is a functional block diagram of a technique for implementing a user interface in accordance with a second embodiment of the instant disclosure.

Referring now to FIG. 7, a functional block diagram of a second embodiment is illustrated. In particular, the illustrated functionality may be used to implement a user interface based on identification of similar spelling error according to the tokens found in a targeted text listing, as described in further detail below. As will be appreciated by those having ordinary skill in the art, the processing embodied by the functional block diagram of FIG. 7 (as well as the flowchart illustrated in FIG. 8) may be implemented by the system 100 described above, particularly one of or a combination of the various processors 109, 114 operating under the control of instructions stored on the corresponding storage components 110, 116.

As shown, targeted text from a targeted text listing 1s provided to a tokenizing/characterization component 702. As described above relative to the tokenizing component 204, tokenizing/characterization component 702 extracts tokens from the targeted text. Additionally, the tokenizing/ characterization component 702 performs various analyses to further characterize each of the extracted tokens. In particular, characteristics of each token include how often each token occurs within the targeted text listing and an identification of those other tokens surrounding each token, i.e., those tokens occurring within a certain distance both before and after a given token. For example, a distance of one will identify only those tokens immediately preceding and following a given token, whereas a distance of two will identify the two tokens preceding the given token and the two tokens following the given token. In an optional step, the tokenizing/characterization component 702 may also group the extracted tokens according to their character length, i.e., all four-letter words are grouped together, all five-letter tokens are grouped together, etc. As described below, such grouping may improve processing speed during similar word identification. Based on these characterizations of each token, various filtering techniques are employed, as described below, to determine whether a given token represents an instance of a similar spelling error.

A similar spelling error identification component 704 takes as input the characterized tokens and operates to identify any similar spelling errors in the tokens. As described in further detail below, this is accomplished by applying a number of filtering techniques to exclude certain tokens from being considered as similar spelling errors or typographical errors. This is done to minimize the likelihood of generating false-positive indications of similar spelling errors. Examples of such filtering include: phrase filtering in which tokens occurring in a predefined phrase are excluded from being considered as similar spelling errors or typographical errors; frequency filtering in which tokens occurring comparatively more frequently are excluded from being considered as similar spelling errors or typographical errors; and exclusion filtering in which tokens satisfying an exclusion rule are excluded from being considered as similar spelling errors or typographical errors. Thereafter, any remaining tokens that have not been excluded from being considered as similar spelling errors or typographical errors are first analyzed to identify potential similar tokens, which tokens and their potential similar tokens are then subjected to similar token exclusion filtering to determine whether instances of similar spelling errors have occurred.

Following similar spelling identification, any tokens that have not been previously excluded from being identification as typographical errors and that have not been identified as similar spelling errors are processed by a typographical error identification component 706. Using one or more dictionaries 708, the typographical error identification component 706 further operates to further exclude any such remaining tokens that are found in a dictionary. Following this dictionary-based exclusion, any remaining tokens are considered instances of typographical errors. Thereafter, the similar spelling error instances and typographical error instances are provided to a user interface generation component 710. In similar fashion to the user interface generation component 216 described above, the user interface generation component 710 illustrated in FIG. 7 generates a user interface based on the similar spelling error and typographical error instances. Once again, this information may be presented in any of variety of graphical, symbolic and/or textual forms, an example of which is described in further detail below.

Figure 8:
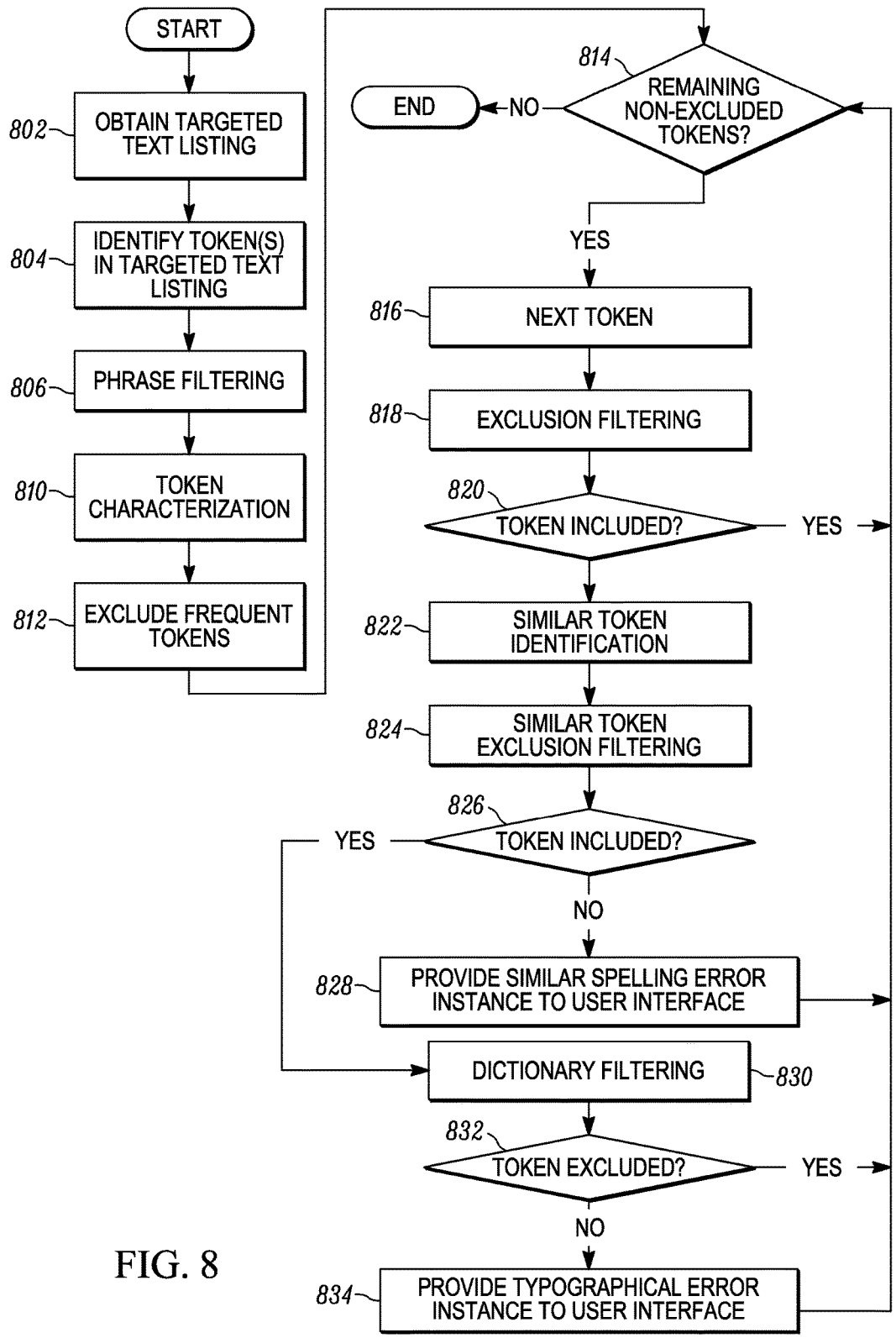
FIG. 8 is a flowchart illustrating processing in accordance with the second embodiment of the instant disclosure.

Referring now to FIG. 8, a flowchart illustrating baseline processing in accordance with the first embodiment is shown. Thus, beginning at block 802, a targeted text listing is obtained using any of the above-described techniques and, thereafter, a plurality of tokens are identified in the targeted text listing using, once again, the above-described tokenization techniques. Processing then continues at block 806 where phrase filtering is performed. Specifically, one or more predefined phrases may be provided, which predefined phrases are preferably unique to the particular domain of the targeted text listing. For example, in the patent application domain, certain reoccurring phrases, e.g., "one skilled in the art", "a plurality of", etc. may be used for this purpose. Thus, at block 806, each predetermined phrase is compared against the targeted text listing to determine if that predetermined phrase occurs therein. If an instance of a predetermined phrase is detected, each token in the detected phrase instance is excluded from being considered or identified as an instance of a typographical error or an instance of a similar spelling error. Phrase filtering in this manner presumes that certain domain-specific expressions, though idiosyncratic relative to non-domain or "typical" usage, should nevertheless be excluded from typographical error/similar spelling error consideration by virtue of their accepted use with the particular domain.

Processing then continues at block 810 where the above-described token characterization (i.e., determining how often each token occurs, identifying those tokens within a certain distance preceding and following each token and, optionally, grouping tokens of similar character length together) is performed. At block 812, the frequency of each token (as determined in the previous block) is inspected to determine whether each token is less than a threshold. If the frequency of a given token is not less than the threshold, then it is excluded from being considered or identified as an instance of a typographical error or an instance of a similar spelling error. For example, by setting the threshold at two, tokens occurring two or more times are excluded on the assumption that sufficiently frequent tokens are unlikely to be the result of typographical or similar spelling errors, whereas tokens that appear only once are more likely to include an error.

Remaining blocks 814-832 establish a processing loop whereby all tokens that have not been previously excluded are further subjected to filtering on an individual basis. Thus, at block 814, a determination is made if there are any remaining non-excluded tokens and, if so, the next token is selected at block 816. Thereafter, at block 818, exclusion filtering is performed whereby an individual token is excluded from being considered or identified as an instance of a typographical error or an instance of a similar spelling error if it satisfies any of a number of exclusion rules. Table 1 below sets forth a variety of exclusion rule examples that, if any one rule is found to be true relative to a given token, cause that token to be excluded. Essentially, the exclusion rules are heuristics that may be generally applicable or specific to a given domain.

Table 1

(a) The token is shorter than a certain length (e.g., single letter words).
(b) The token is in the list of month names, and there is a year nearby.
(c) The token is in the list of abbreviations for corporations (e.g., "Inc", "Corp", "Int", etc).
(d) The token is capitalized and is followed by "et al".
(e) The token is capitalized and is preceded by a date.
(f) The token is 'Si' and is preceded by a dash and a capitalized word.
(g) The token is on the list of given names or surnames.
(h) The token is capitalized, adjacent to a dash, and that dash is adjacent to a given name or surname.
(i) The token precedes a name and is in the list of name prefixes (e.g., "Mr", "Dr", etc).
(j) The token follows a name and is in the list of name suffixes (e.g., "DDS", "Jr", etc).
(k) The token is followed by a dash and is on the list of prefixes (e.g., "un", "over", "pre", etc).
(l) The token is on the list of measurement units (e.g., "inch") and is preceded by a number.
(m) The token is in quotes by itself (e.g., "spd").
(n) The token before it contains the same letters in the same order regardless of case and extra letters. For example, in "benzocyclobutene (BCB)" the token "BCB" is not a typo and benzocyclobutene is marked as defining the abbreviation.
(o) The token before it, or the tokens after it, have the same initial letters or same capitalized letters. For example, FBI is not a typo in "Federal Bureau of Investigation (FBI)" or "FBI (Federal Bureau of Investigation)".

(p) Same as the previous rule, but ignoring lowercase 's' at the end of the acronym. For example "access control lists (ACLs)".

(q) Same as previous rule, but with a predefined list of words that can make an 'X' in the acronym. For example, "cross site scripting (XSS)" where "cross" is in the list of words that can become an "X".

(r) The token is used to define the acronym/abbreviation of another word (detected and marked in earlier steps). For example, 'Federal' in "Federal Bureau of Investigation (FBI)" or 'benzocyclobuten' in "benzocyclobutene (BCB)" are not typos.

(s) The token meets the rules for Roman numerals.

(t) The token is on a list of special exceptions ("too", "nor") that often turn out to be false positives.

Processing then continues at block 820 where it is determined whether the current token under consideration was excluded according to the processing of block 818. If so, processing continues at blocks 814 et seq where the next token, if any, is considered. If the current token under consideration was not excluded per any of the exclusion rules, processing continues at block 822 where similar tokens from within the targeted text listing are identified. In an embodiment, this is done by comparing the current token against all other tokens of the plurality of tokens for which there may be a single change difference. Such single change differences may arise by virtue of deletion (e.g., "the"→"he"), insertion (e.g., "car"→"cart"), duplication (e.g., "bet"→"beet"), replacement (e.g., "cat"→"hat") or transposition→ (e.g., "two"→"tow"). To facilitate such processing in real time (or near real time), the length-based token groupings optionally performed at block 810 may be employed to limit the number of comparisons. For example, in order to test the noted difference possibilities, a token that is four letters in length would only need to be compared against tokens that are three, four or five letters in length. Because the grouped tokens are only drawn from the targeted text listing, the myriad single change difference possibilities for any given token are reduced given likelihood that only a few such variations would be found in the targeted text listing, e.g., there are 260 single change differences for the token "donut" but it is likely that only a small number, if any, will occur in any a given targeted text listing. A further processing optimization when comparing tokens is to initially compare the first two characters of the tokens against each other. Typically, if there are any differences between the two tokens, they are likely to be found in the first two letters. Furthermore, if the first two letters are different there is necessarily more than a single change difference between the two tokens, thereby eliminating any possibility of qualifying as a similar token.

Having identified any similar tokens for the current token, processing continues at block 824 where similar token exclusion filtering is performed. Once again, an individual token is excluded from being considered or identified as an instance of a typographical error or an instance of a similar spelling error if it satisfies any of a number of similar token exclusion rules. Table 2 below sets forth a variety of similar token exclusion rule examples that, if any one rule is found to be true relative to a given token, cause that token to be excluded. Once again, the similar token exclusion rules are heuristics that may be generally applicable or specific to a given domain.

Table 2

(a) The similar token is in a list of words that must be followed by or preceded by another word, which would not be true if it replaced the current token ("et al", "ipso facto")

(b) The current token is, by itself, all uppercase or mixed case, but the similar token never occurs that way. For example, "Vt" in the middle of a sentence cannot be replaced by "At" unless "At" also appears in the middle of sentence with that casing.

(c) The current token and the similar token have incompatible casing. The rule is that lowercase and capitalized can replace each other, but all upper and mixed case can only be replaced by identical casing. For example, "hello" cannot be replaced by "JELLO" or "jEllo" but can be replaced by "jello" or "Jello".

(d) The similar token is a tense, plural, or possessive or the current token. For example, "forms" cannot replace "form".

(e) The similar token, if used to replace the current token, would result in a sentence where a word repeats. For example, "in an way" cannot have "an" replaced with "in", because then it would become "in in way".

(f) The similar token does not occur often enough (e.g., 3 times) in the targeted text listing.

(g) The current token is preceded by an indefinite article ('a' or 'an') that does not match the similar taken.

(h) The current token appears in a common phrase, but with the similar token replacing it, it does not.

(i) The similar token occurs significantly fewer times in common usage than the current token. For example, if the ratio of the similar token to the current token is less than 0.4, then it is deemed to have occurred significantly fewer times.

Referring once again to FIG. 8, processing continues at block 826 where it is determined whether the current token and any of its similar tokens satisfied any of the similar token exclusion rules at block 824, i.e., whether the current token has been excluded. If not, the current token is designated as an instance of a similar spelling error and, at block 826, the similar spelling error instance, including the current token and any similar tokens, are provided to the user interface. An example of a user interface in accordance with block 826 is further illustrated in FIG. 9.

Figure 9:
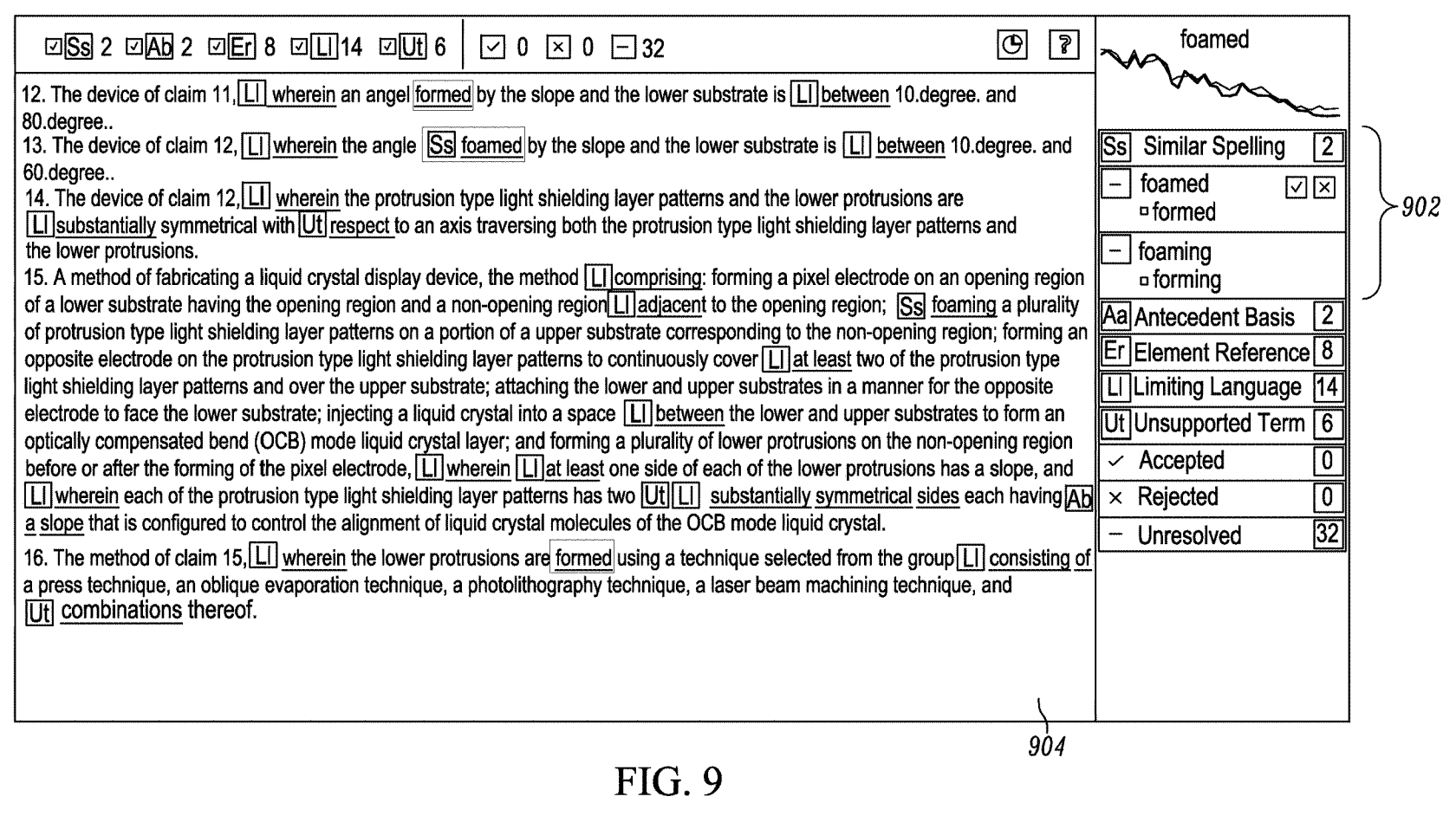

The example of FIG. 9 includes a similar spelling window 902 displayed alongside a portion of the targeted text listing 904. The example of FIG. 9 is directed to text taken from a patent application domain. The similar spelling window 902 may be expanded and collapsed using graphical user interface controls well-known in the art, e.g., by clicking on the label "Similar Spelling." Likewise, other features particularly directed to the patent application domain, such as Antecedent Basis, Element Reference, Limiting Language and Unsupported Terms, may likewise have corresponding windows expand and collapse based on selection thereof. With the displayed portion of the targeted text listing 904, words (corresponding to identified tokens) may be highlighted or otherwise include corresponding indicia to the extent that they satisfy some criteria pertaining a corresponding feature. For example, with regard to the Similar Spelling feature, words (tokens) identified at blocks 824, 826 as being similar spelling error instances are indicated in the display by a background color matching the color used in the similar spelling window 902 and by the "Ss" indicia immediately preceding the relevant words. Selection of one of the highlighted words adjusts the focus of the similar spelling window 902 accordingly.

For example, in the illustrated scenario, two similar spelling error instances have been identified and displayed, i.e., "foamed" has a similar spelling to "formed" and "foaming" has a similar spelling to "forming." Selection of the instance of "foamed" (in that line of text beginning with the number "13") causes the focus of the similar spelling window 902 to be directed to the "foamed"/"formed" similar spelling error instance. In the illustrated embodiment, this focus is indicated by the provision of accept/reject buttons (respectively illustrated by a button having a check mark displayed therein and by another button have an X-mark displayed therein). By selecting the accept button, the similar spelling error instance (i.e., "foamed") is replaced by the similar token (i.e., "formed") within the targeted text listing, thereby resolving that instance (and, preferably, all other identical instances) of the similar spelling error. Alternatively, selection of the reject button is an indication from the user that the similar spelling error is not, in fact, a similar spelling error. Thus, in the noted example, selection of the rejection button is an indication that the word "foamed" was intended and that it is not a similar spelling error relative to the similar token "formed." Similar spelling error instances may be provided with a further indicia (in this example, a box having a dash in it) to indicate that the corresponding similar spelling error instance has not yet been resolved (accepted or rejected).

Referring once again to FIG. 8, after the similar spelling error instance has been provided to the user interface at block 826, processing proceeds once again to block 814 where any remaining tokens are processed as described above. It is noted that, while block 826 is illustrated as being performed each time a similar spelling error instance is identified, in practice, those skilled in the art will appreciate that instances of similar spelling errors could be stored as they are identified and, after all tokens have been processed (i.e., the "no" branch out of block 814), provided to the user interface all at once.

Referring back to block 824, if the similar token exclusion filtering does not result in the current token being identified as a similar spelling error instance, processing may continue at block 830 where dictionary filtering is performed. For example, in the context of a patent application domain in which scientific and/or engineering terms are likely to be used, the current token is excluded from being a typographical error if any of the following are true: (i) the token is found in a common dictionary, (ii) the token is found in an engineering or scientific dictionary, the token has a hyphen in it and either the part preceding or following the hyphen is found in a dictionary, or (iv) the token is a plural, singular, possessive, or different tense of another token found in the common or scientific/engineering dictionary. Thereafter, at block 832, it is determined if the token was excluded by virtue of the dictionary filtering. If so, processing continues at block 814 as before. If not, then the current token is deemed an instance of a typographical error and processing continues at block 834 where the typographical error instance is provided to the user interface. Techniques for displaying typographical error instances are well known in the art, and such techniques may be equally employed herein.

While particular preferred embodiments have been shown and described, those skilled in the art will appreciate that changes and modifications may be made without departing from the instant teachings. For example, while many of the examples referred to herein are with respect to a patent application domain, it is appreciated that the instant disclosure is not limited in this regard. For example, another useful domain could include contracts and/or other legal agreements. Such documents often require a particular format that facilitates the trend processing described above.

In another example, it is noted that the use of electronic discovery in legal proceedings has recently expanded at a rapid pace. To facilitate review of often copious discovery documents resulting from electronic discovery, the trend processing described herein could be applied to the relevant discovery documents to determine when certain words have been used, thereby permitting focusing of review of the discovery documents on a particular point in time. Further still, frequent use of uncommon words throughout the discovery documents may suggest the use of a "code word" by one of the parties, which may merit further investigation.

Furthermore, it is noted that the first embodiment described above teaches the use of a context-matched/non-context-matched dichotomy. However, in an alternative embodiment, matching and non-matching contexts could be generalized to a first context and a second context different from the first, without any qualifications as to matching or non-matching. In this case, the first and second contexts could be any desired contexts, regardless of the context of the selected token.

It is therefore contemplated that any and all modifications, variations or equivalents of the above-described teachings fall within the scope of the basic underlying principles disclosed above and claimed herein.

What is claimed is:

1. A method for providing a user interface of a machine for production of electronic text-based documents and, the machine comprising at least one processor and a display, the method comprising:

identifying, by the at least one processor, at least one baseline token in a baseline text corpus comprising text corresponding to a selected domain;

identifying, by the at least one processor, for each of the at least one baseline token, a plurality of corresponding baseline contexts;

for each of the at least one baseline token, and for each of the plurality of corresponding baseline contexts for the baseline token,
determining, by the at least one processor, frequency of use data;
storing, by the at least one processor, the frequency of use data in association with the baseline token and the corresponding baseline context;

identifying, by the at least one processor, at least one token in a targeted text listing;

identifying, by the at least one processor, for each of the at least one token, a corresponding context based on the targeted text listing;

for a selected token of the at least one token in the targeted text listing, identifying, by the at least one processor, context-matched usage data and non-context-matched usage data for a matching baseline token that matches the selected token, wherein the context-matched usage data comprises frequency of use data for the matching baseline token in a first baseline context that matches the corresponding context of the selected token, wherein the non-context-matched usage data further comprises frequency of use data for the matching baseline token in a second baseline context that does not match the corresponding context of the selected token, and wherein the matching baseline token, the first baseline context and the second baseline context are based on the baseline text corpus; and providing, by the at least one processor to the user interface on the display, the context-matched usage data and the non-context-matched usage data.

2. The method of claim 1, further comprising:
receiving, by the at least one processor, identification of an electronic document as the targeted text listing.

3. The method of claim 1, further comprising:
receiving, by the at least one processor via the user interface, text data as the targeted text listing.

4. The method of claim 1, wherein determining the frequency of use data further comprises normalizing the frequency of use data relative to a normalizing parameter determined according to the corresponding baseline context.

5. The method of claim 1, wherein identifying context-matched usage data and non-context-matched usage data further comprises:
comparing, by the at least one processor, the selected token with the at least one baseline token to identify the matching baseline token;
comparing, by the at least one processor, the corresponding context of the selected token with the at least one corresponding baseline context of the matching baseline token to identify a matching context and a non-matching context of the plurality of corresponding baseline contexts;
providing, by the at least one processor as the context-matched usage data, that frequency of use data stored in association with the matching baseline token and the matching context; and
providing, by the at least one processor as the non-context-matched usage data, that frequency of use data stored in association with the matching baseline token and the non-matching context.

6. The method of claim 1, wherein providing the context-matched usage data and the non-context-matched usage data to the user interface on the display further comprises displaying the context-matched usage data and the non-context-matched usage data in any one or combination of: graphical form, symbolic form and textual form.

7. The method of claim 1, further comprising:
identifying, by the at least one processor, a related baseline token based on the selected token;
identifying, by the at least one processor, additional context-matched usage data and additional non-context-matched usage data for the related baseline token, wherein the additional context-matched usage data comprises frequency of use data for the related baseline token in a third baseline context matching the corresponding context of the selected token, and wherein the additional non-context-matched usage data further comprises frequency of use data for the baseline token in a fourth baseline context not matching the corresponding context of the selected token; and
providing, by the at least one processor to the user interface on the display, the additional context-matched usage data and the additional non-context-matched usage data.

8. The method of claim 7, wherein the related baseline token is related to the selected token by any of: a synonym relationship, an antonym relationship, a hypernym relationship, a meronym relationship, a holonym relationship, a homophone relationship, a category relationship, a trend behavior relationship and an overall usage count relationship.

9. An apparatus for production of electronic text-based documents based on a user interface, the apparatus comprising:
at least one processor operatively connected to a display;
a storage device operatively connected to the at least one processor and having stored thereon instructions that, when executed by the at least one processor, cause the at least one processor to:
identify at least one baseline token in a baseline text corpus comprising text corresponding to a selected domain;
identify, for each of the at least one baseline token, a plurality of corresponding baseline contexts;
for each of the at least one baseline token, and for each of the plurality of corresponding baseline contexts for the baseline token,
determine frequency of use data;
store the frequency of use data in association with the baseline token and the corresponding baseline context;
identify at least one token in a targeted text listing;
identify, for each of the at least one token, a corresponding context based on the targeted text listing;
for a selected token of the at least one token in the targeted text listing, identify context-matched usage data and non-context-matched usage data for a matching baseline token that matches the selected token, wherein the context-matched usage data comprises frequency of use data for the matching baseline token in a first baseline context that matches the corresponding context of the selected token, wherein the non-context-matched usage data further comprises frequency of use data for the matching baseline token in a second baseline context that does not match the corresponding context of the selected token, and wherein the matching baseline token, the first baseline context and the second baseline context are based on the baseline text corpus; and
provide, to the user interface on the display, the context-matched usage data and the non-context-matched usage data.

10. The apparatus of claim 9, wherein the storage device further comprises instructions that, when executed by the at least one processor, cause the at least one processor to:
receive identification of an electronic document as the targeted text listing.

11. The apparatus of claim 9, wherein the storage device further comprises instructions that, when executed by the at least one processor, cause the at least one processor to:
receive, via the user interface, text data as the targeted text listing.

12. The apparatus of claim 9, wherein those instructions that, when executed by the at least one processor, cause the at least one processor to determine the frequency of use data are further operative to normalize the frequency of use data relative to a normalizing parameter determined according to the corresponding baseline context.

13. The apparatus of claim 9, wherein those instructions that, when executed by the at least one processor, cause the at least one processor to identify context-matched usage data and non-context-matched usage data are further operative to:
compare the selected token with the at least one baseline token to identify the matching baseline token;
compare the corresponding context of the selected token with the at least one corresponding baseline context of the matching baseline token to identify a matching context and a non-matching context of the plurality of corresponding baseline contexts;
provide, as the context-matched usage data, that frequency of use data stored in association with the matching baseline token and the matching context; and
provide, as the non-context-matched usage data, that frequency of use data stored in association with the matching baseline token and the non-matching context.

14. The apparatus of claim 9, wherein those instructions that, when executed by the at least one processor, cause the at least one processor to provide the context-matched usage data and the non-context-matched usage data to the user interface on the display are further operative to display the context-matched usage data and the non-context-matched usage data in any one or combination of: graphical form, symbolic form and textual form.

15. The apparatus of claim 9, wherein the storage device further comprises instructions that, when executed by the at least one processor, cause the at least one processor to:
   identify a related baseline token based on the selected token;
   identify additional context-matched usage data and additional non-context-matched usage data for the related baseline token, wherein the additional context-matched usage data comprises frequency of use data for the related baseline token in a third baseline context matching the corresponding context of the selected token, and wherein the additional non-context-matched usage data further comprises frequency of use data for the baseline token in a fourth baseline context not matching the corresponding context of the selected token; and
   provide, to the user interface on the display, the additional context-matched usage data and the additional non-context-matched usage data.

16. The apparatus of claim 15, wherein those instructions that, when executed by the at least one processor, cause the at least one processor to identify the related baseline token are further operative to identify, between the related baseline token and the selected token, any of: a synonym relationship, an antonym relationship, a hypernym relationship, a meronym relationship, a holonym relationship, a homophone relationship, a category relationship, a trend behavior relationship and an overall usage count relationship.

17. A non-transitory, machine-readable medium having stored thereon instructions that, when executed by at least one processor, cause the at least one processor to operate as an apparatus for production of electronic text-based documents based on a user interface and to:
   identify at least one baseline token in a baseline text corpus comprising text corresponding to a selected domain;
   identify, for each of the at least one baseline token, a plurality of corresponding baseline contexts;
   for each of the at least one baseline token, and for each of the plurality of corresponding baseline contexts for the baseline token,
      determine frequency of use data;
      store the frequency of use data in association with the baseline token and the corresponding baseline context;
   identify at least one token in a targeted text listing;
   identify, for each of the at least one token, a corresponding context based on the targeted text listing;
   for a selected token of the at least one token in the targeted text listing, identify context-matched usage data and non-context-matched usage data for a matching baseline token that matches the selected token, wherein the context-matched usage data comprises frequency of use data for the matching baseline token in a first baseline context that matches the corresponding context of the selected token, wherein the non-context-matched usage data further comprises frequency of use data for the matching baseline token in a second baseline context that does not match the corresponding context of the selected token, and wherein the matching baseline token, the first baseline context and the second baseline context are based on the baseline text corpus; and
   provide, to the user interface on a display operatively connected to the at least one processing device, the context-matched usage data and the non-context-matched usage data.

18. The machine-readable medium of claim 17, further comprising instructions that, when executed by the at least one processor, cause the at least one processor to:
   receive identification of an electronic document as the targeted text listing.

19. The machine-readable medium of claim 17, further comprising instructions that, when executed by the at least one processor, cause the at least one processor to:
   receive, via the user interface, text data as the targeted text listing.

20. The machine-readable medium of claim 17, wherein those instructions that, when executed by the at least one processor, cause the at least one processor to determine the frequency of use data are further operative to normalize the frequency of use data relative to a normalizing parameter determined according to the corresponding baseline context.

21. The machine-readable medium of claim 17, wherein those instructions that, when executed by the at least one processor, cause the at least one processor to identify context-matched usage data and non-context-matched usage data are further operative to:
   compare the selected token with the at least one baseline token to identify the matching baseline token;
   compare the corresponding context of the selected token with the at least one corresponding baseline context of the matching baseline token to identify a matching context and a non-matching context of the plurality of corresponding baseline contexts;
   provide, as the context-matched usage data, that frequency of use data stored in association with the matching baseline token and the matching context; and
   provide, as the non-context-matched usage data, that frequency of use data stored in association with the matching baseline token and the non-matching context.

22. The machine-readable medium of claim 17, wherein those instructions that, when executed by the at least one processor, cause the at least one processor to provide the context-matched usage data and the non-context-matched usage data to the user interface on the display are further operative to display the context-matched usage data and the non-context-matched usage data in any one or combination of: graphical form, symbolic form and textual form.

23. The machine-readable medium of claim 17, further comprising instructions that, when executed by the at least one processor, cause the at least one processor to:
   identify a related baseline token based on the selected token;
   identify additional context-matched usage data and additional non-context-matched usage data for the related baseline token, wherein the additional context-matched usage data comprises frequency of use data for the related baseline token in a third baseline context matching the corresponding context of the selected token, and wherein the additional non-context-matched usage data further comprises frequency of use data for the baseline token in a fourth baseline context not matching the corresponding context of the selected token; and
   provide, to the user interface on the display, the additional context-matched usage data and the additional non-context-matched usage data.

24. The machine-readable medium of claim 23, wherein those instructions that, when executed by the at least one processor, cause the at least one processor to identify the related baseline token are further operative to identify, between the related baseline token and the selected token, any of: a synonym relationship, an antonym relationship, a hypernym relationship, a meronym relationship, a holonym relationship, a homophone relationship, a category relationship, a trend behavior relationship and an overall usage count relationship.

* * * * *